E. T. M. ECKERT.
AUTOMOBILE LOCKING DEVICE.
APPLICATION FILED MAR. 17, 1917.

1,280,690.

Patented Oct. 8, 1918.

INVENTOR
Edwin T. M. Eckert

BY
William A. Stock
ATTORNEY

UNITED STATES PATENT OFFICE.

EDWIN T. M. ECKERT, OF OAKLAND, CALIFORNIA.

AUTOMOBILE-LOCKING DEVICE.

1,280,690.　　　　Specification of Letters Patent.　　Patented Oct. 8, 1918.

Application filed March 17, 1917. Serial No. 155,924.

*To all whom it may concern:*

Be it known that I, EDWIN T. M. ECKERT, a citizen of the United States, residing at Oakland, in the county of Alameda and State of California, have invented certain new and useful Improvements in Automobile-Locking Devices, of which the following is a specification.

This invention relates to improvements in automobile locking devices. It has as its principal object the construction of a device for this purpose which may be readily attached to any car and which will effectively prevent the operation of the car when the device is in its locked position.

My device aims to prevent the unauthorized use of a car by locking the brake lever clutch pedal or the gear shifting lever in a position such that the car cannot be operated or can only be operated in a backward direction. At the same time my device when applied to permit only backward movement, complies with the ordinances of various cities which prohibit the locking of a car on public streets in such a manner that they cannot be moved in case of emergency.

With these and other objects in view the invention consists of the novel constructions, combinations and arrangements of parts herein described and more specifically pointed out in the appended claim; it will be understood however, that changes in form, position and minor details of construction within the scope of the claim may be resorted to, without departing from the spirit of the invention or sacrificing any of the advantages thereof.

For a full comprehension of the invention reference should be had to the accompanying drawing forming a part of the specification wherein.

Figure 1:
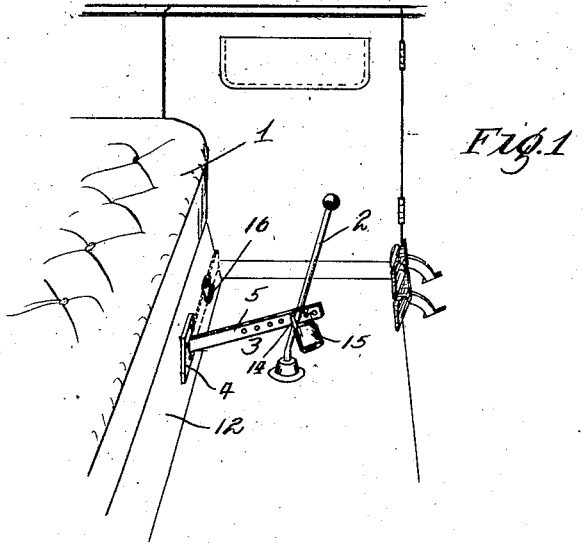
Figure 1 is a view in perspective showing the driver's seat in an automobile and my improved device in its locking position.
Figure 2:
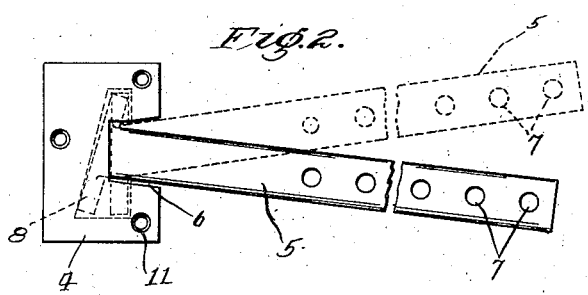
Fig. 2 is a view in front elevation of the device.
Figure 3:
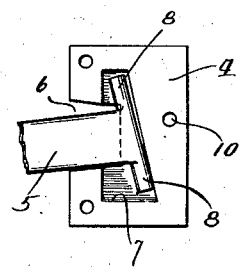
Fig. 3 is a view in rear elevation of the holding member and the inner end of the movable arm.
Figure 4:
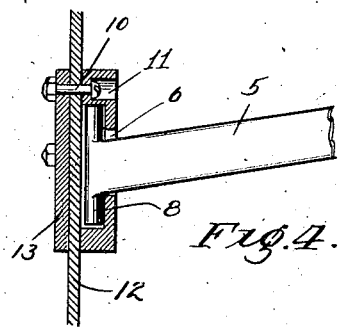
Fig. 4 is a view in section through the base member of this device showing the manner in which it is attached to some fixed part of the automobile.

Referring to corresponding parts in the several views by the same numerals of reference, 1 denotes the driver's seat in an automobile and 2 the gear shift lever. My improved locking device is denoted in general by 3 and is here shown attached to the front wall 12 of the driver's seat.

This device consists of the base plate 4 and a locking arm 5. The former is preferably rectangular in shape and is provided on one side with a notch 6 having slightly diverging top and bottom surfaces. On the back of this member is formed a substantial triangular recess 7 communicating with the notch 6. The arm 5 may be of any suitable cross section and has on its outer end a plurality of holes 7 and on its inner end the integrally formed pins 8 extending laterally from each edge. The axes of these pins are disposed at an angle to the axis of member 6 so that when the device is attached to the holding surface the arm will project upwardly in an angular direction. I prefer to form the bar 5 of hard steel that the same cannot be cut with a hacksaw or file.

The base number 4 is provided with holes having the enlarged counter-sunk portion 11 of sufficient depth that the head of the holding screws 10 will be entirely concealed and so prevented from being cut off.

For greater security the device is attached to the front seat board 12 with a plate 13 on the back thereof. The holding screws extend through the front board and this holding plate and are riveted over on the back to prevent their easy removal.

As heretofore explained the device may be attached to the front board 12 just back of a gear shift lever 2 and when not in use the arm 5 may be moved around until it lies flat against the board 12 where a suitable spring holding clamp 16 is provided to keep the arm in place and prevent rattle.

When it is desired to prevent use of the car, lever 2 is placed preferably in its reverse position and arm 3 is moved around until it lies flat against this lever. The curved hook 14 of the padlock 15 is then slipped through one of the openings 7 and around the lever 2 thus locked. When in this position the lever 2 cannot be pulled backward in order to pass from reverse to neutral and thus if the engine is started the car can only be run backward.

This it will be realized will not prevent the clutch from being disengaged and the car moved by external power in either direction but the drag of a car with its wheels thus locked in reverse will be much greater than if the gear lever was in neutral and hence it will be difficult to tow it away.

While I have shown the device applied to the gear shift lever it may in the same manner be applied to the emergency brake lever, or to the service brake or clutch pedal.

I claim as new and wish to cover by Letters Patent:

A locking device comprising in combination with one of the movable operating levers of an automobile, an arm adapted to be positioned adjacent said lever and having a plurality of transverse openings, a base member having a substantial triangular recess in one face and having a notch extending transversely from said recess, an integrally formed pin extending from the edges of the inner end of said arm said pin being adapted to hold said arm in said base member and locking means adapted to attach said arm to said operating lever.

In testimony whereof I affix my signature.

EDWIN T. M. ECKERT